(12) United States Patent
Jansma et al.

(10) Patent No.: US 8,851,950 B2
(45) Date of Patent: Oct. 7, 2014

(54) RECYCLABILITY OF FLUORESCENT LAMP PHOSPHORS

(71) Applicant: General Electric Company, Schenectady, NY (US)

(72) Inventors: Jon Bennett Jansma, Pepper Pike, OH (US); David James Monk, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/626,900

(22) Filed: Sep. 26, 2012

(65) Prior Publication Data

US 2014/0084779 A1    Mar. 27, 2014

(51) Int. Cl.
H01J 9/50    (2006.01)

(52) U.S. Cl.
USPC ........ 445/2; 445/1; 445/60; 445/61; 423/21.1

(58) Field of Classification Search
USPC ...................... 313/483–487; 445/1–2, 60–61;
252/301.4 R–301.4 H; 243/21.1;
423/21.1
See application file for complete search history.

(56) References Cited

U.S. PATENT DOCUMENTS

| 5,045,752 | A * | 9/1991 | Jansma | 313/487 |
| 7,887,718 | B2 * | 2/2011 | Nagatomi et al. | 252/301.4 F |
| 2002/0180339 | A1 | 12/2002 | Jansma | |
| 2007/0090765 | A1 * | 4/2007 | Deme et al. | 313/637 |
| 2009/0079324 | A1 * | 3/2009 | Deme et al. | 313/489 |
| 2009/0236963 | A1 * | 9/2009 | Nagatomi et al. | 313/483 |
| 2010/0051868 | A1 | 3/2010 | Le-Mercier et al. | |
| 2011/0206580 | A1 | 8/2011 | Porob et al. | |
| 2012/0032113 | A1 | 2/2012 | Buissette et al. | |
| 2012/0152062 | A1 | 6/2012 | Gourishankar et al. | |
| 2013/0026908 | A1 * | 1/2013 | Nagatomi et al. | 313/503 |

FOREIGN PATENT DOCUMENTS

| EP | 1568753 A2 | 8/2005 |
| EP | 1630219 A2 | 3/2006 |

OTHER PUBLICATIONS

Li, Ji-Guang, et al., "Monodispersed Colloidal Spheres for Uniform Y203:Eu3+ Red-Phosphor Particles and Greatly Enhanced Luminescence by Simultaneous Gd3+ Doping", Journal of Physical Chemistry C, vol. No. 112, Issue No. 31, pp. 11707-11716, Aug. 7, 2008.

Shimizu, Ryosuke, et al., "Supercritical fluid extraction of rare earth elements from luminescent material in waste fluorescent lamps", Journal of Supercritical Fluids, vol. No. 33, Issue No. 3, pp. 235-241, Mar. 1, 2005.

(Continued)

Primary Examiner — Nimeshkumar Patel
Assistant Examiner — Jose M Diaz
(74) Attorney, Agent, or Firm — Global Patent Operation; Peter T. DiMauro

(57) ABSTRACT

Improved recyclability of phosphors in fluorescent lamps is provided. A fluorescent lamp is constructed with phosphor particles having a specific surface area less than a certain predetermined value. During recycling, these phosphor particles are more readily separated from the basing cement used in such fluorescent lamp. A method is also provided by which such phosphors are more readily separated from the basing cement.

17 Claims, 4 Drawing Sheets

(56) References Cited

OTHER PUBLICATIONS

Hirajima, T., et al., "Feasibility of an efficient recovery of rare earth-activated phosphors from waste fluorescent lamps through dense-medium centrifugation", Separation and Purification Technology, vol. No. 44, Issue No. 3, pp. 197-204, Aug. 1, 2005.

Michelis, Ida DE., et al., "Treatment of exhaust fluorescent lamps to recover yttrium: Experimental and process analyses", Waste Management, vol. No. 31, Issue No. 12, pp. 2559-2568, Jul. 3, 2011.

PCT Search Report and Written Opinion dated Nov. 11, 2013 from corresponding Application No. PCT/US2013/056925.

* cited by examiner

RECYCLABILITY OF FLUORESCENT LAMP PHOSPHORS

FIELD OF THE INVENTION

The subject matter of the present disclosure relates generally to improving the recyclability of phosphors used in fluorescent lamps.

BACKGROUND OF THE INVENTION

Fluorescent lamps are typically constructed from a sealed glass tube that contains a small amount of mercury and an inert gas such as argon, xenon, neon, or krypton. Electrodes made of e.g., coiled tungsten are placed at different ends of the tube and are connected with an electrical circuit. When the mercury is properly vaporized within the lamp tube, applying a sufficient voltage difference across the electrodes will cause a current to flow through the gas in the tube thereby exciting the gas molecules and causing a release of photons—albeit in the form of short wave, ultraviolet light—a wavelength that does not provide the visible light that is desired.

The inside of the gas tube is coated with phosphors—i.e. substances that can luminesce or give off light. More particularly, these phosphors are commonly applied as a paint-like coating to the inside of the tube. Organic solvents in the applied coating are allowed to evaporate leaving behind the phosphors. The tube may also be heated to remove residual solvent and fuse the coating to the lamp tube.

Photons released from the excited gas are absorbed by this coating of phosphors. In turn, the phosphors also emit photons but at a longer wave length than the photons released from the excited gas and, more importantly, at a wavelength that provides visible light. Variables such as the length of the glass tube determine how much visible light is provided by a particular lamp.

Advantageously, the fluorescent lamp converts the electrical energy supplied to its electrodes into a useful light more efficiently than a traditional incandescent lamp. In fact, much of the energy supplied to an incandescent lamp is lost in the form of heat. As a result, the fluorescent lamp is relatively less expensive to operate than an incandescent. Although the initial cost of a fluorescent may be somewhat higher due to a ballast that is required in order to regulate the current, this cost is typically recovered in saved energy costs. Thus, the use of fluorescent lamps has become ubiquitous particularly in commercial applications.

For various reasons, after a period of use, fluorescent lamps eventually require replacement. By way of example, the electrodes may eventually fail, the small amount of mercury in the tube may absorb into the glass, the efficiency of the phosphors in absorbing and emitting photons may decrease, and other reasons may require replacement as well. As a result, a significant amount of fluorescent lamps must be disposed of each year.

The phosphors used in fluorescent lamps are typically rare earth compounds of various types. For example, europium-doped yttrium oxide (YEO) is widely used in fluorescent lamps as a red-emitting phosphor. Yttrium oxide that has been doped with other lanthanide series rare earth metals can also be used. A blend of phosphors, sometimes referred to as a triphosphor blend, is commonly used to provide white light from e.g., a red-emitting phosphor, a green-emitting phosphor, and a blue-emitting phosphor.

While the amount of phosphors used in producing an individual fluorescent lamp is relatively small, these phosphors are valuable materials. As such, recycling phosphors from discarded fluorescent lamps is desirable. Unfortunately, certain challenges are presented in attempting to reclaim these phosphor materials.

For example, the phosphors must be separated from multiple other materials that are used in the construction of the fluorescent lamps. These other materials can include glass used in constructing the tube, metals for the electrodes and other components, and plastics for parts such as a lamp base. Another component that can present particular problems is a basing cement, typically containing primarily calcium carbonate, that is used to attach e.g., a base to an end of the sealed tube. This basing cement can be present in small amounts similar to the amount of phosphors that are present. Washing the basing cement from the phosphors is problematic because e.g., both the basing cement and the phosphors may be soluble in the solvents that might be attempted for the wash. However, the phosphors must be separated from the basing cement for successful recycling of the phosphors.

Accordingly, a process for improving the recyclability of phosphors in fluorescent lamps would be useful. More particularly, a process that increases the ability to separate one or more phosphors from the calcium carbonate in the basing cement used in fluorescent lamps would be beneficial. In addition, a fluorescent lamp made with one or more phosphors that can be more readily recycled as compared to conventional phosphors would also be very useful.

BRIEF DESCRIPTION OF THE INVENTION

The present invention provides for the improved recyclability of phosphors in fluorescent lamps. A fluorescent lamp is constructed with phosphor particles having a specific surface area less than a certain predetermined value. During recycling, these phosphor particles are more readily separated from the basing cement used in such fluorescent lamp. A method is also provided by which such phosphors are more readily separated from the basing cement.

In one exemplary embodiment, the present invention provides a fluorescent lamp that includes a plurality of phosphor particles of one or more colors, wherein the phosphor particles of at least one color have a specific surface area of about 5 $m^2$/gram or less.

In another exemplary embodiment, the present invention provides a fluorescent lamp that includes a plurality of phosphor particles of at least three different colors, wherein the phosphor particles of at least one color have a specific surface area of about 5 $m^2$/gram or less.

In another exemplary aspect, the present invention provides a method for phosphor recycling. The method may include the step of providing phosphor particles created from phosphor coated tubes of fluorescent lamps, wherein the phosphor particles of at least one color have a specific surface area of about 5 $m^2$/gram or less. The method includes the steps of: preparing a mixture comprising water, the phosphor particles provided above, and an acid; reacting the acid with basing cement present in the mixture; and separating all or a portion of the phosphor particles from the mixture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
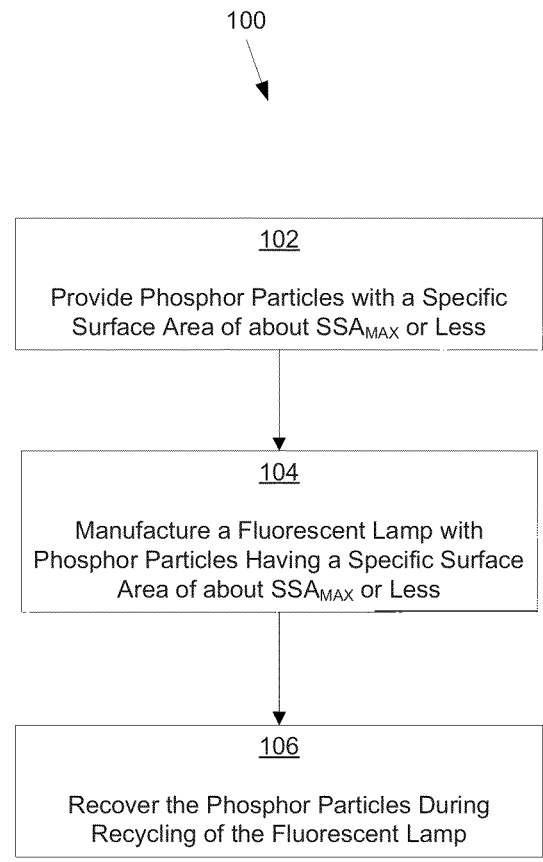
FIGS. 1 and 2 illustrate exemplary methods of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a summary flowchart illustrating an exemplary method 100 of the present invention. In step 102, phosphor particles are provided having a specific surface area the same or less than a certain predetermined maximum specific surface area, $SSA_{MAX}$. In step 104, these phosphor particles are used to manufacture a fluorescent lamp or, more particularly, are provided in a coating applied to the tube of the lamp. Finally, in step 106, the lamp is recycled (e.g., after reaching the end of its useful life) and all or some portion of the phosphor particles are recovered.

By carefully controlling the specific surface area of the phosphor particles that are provided in step 102, the amount of such particles that can be recovered during recycling in step 106 can be substantially improved. For example, by limiting the specific surface area of the phosphor particles to an $SSA_{MAX}$ of about 5 $m^2$/gram or less, more of the phosphor particles can be recovered during a recycling process as will be further described. In another exemplary aspect of the invention, the specific surface area of the phosphor particles is limited to an $SSA_{MAX}$ of about 2 $m^2$/gram or less. In still another exemplary aspect of the present invention, the specific surface area of the phosphor particles is limited to an $SSA_{MAX}$ of about 0.8 $m^2$/gram or less.

Techniques are known for producing phosphor particles. These techniques can be modified to control and/or reduce the specific surface area of the phosphor particles that are provided in step 102. For example, in the manufacture of yttrium-europium oxide (YEO) or red phosphor, conditions for the yttrium-europium oxalate precipitation step can be carefully controlled so as to provide larger particles having a lower specific surface area. This precipitation step is completed before the final high temperature (which may be approximately 1500° C. to 1600° C.) firing, which converts the oxalate to oxide.

Also, one or more fluxes can be used during the high temperature firing process to provide larger phosphor particles—particularly red phosphor particles. The fluxes cause the smaller particles to grow into larger particles having a lower specific surface area during the firing step. Borax and lithium fluoride are fluxes that can be used for this purpose. Any residual flux material is washed from the phosphors after firing is completed.

Additionally, and as another technique for reducing the specific surface area of the phosphor particles used to make a fluorescent lamp, particles having the lower specific surface areas can be separated from the other phosphor particles after the particles have been made. For example, acid washing, sifting, or size exclusion methods (e.g., industrial scale air classification) can be used to separate the larger particles from the smaller particles. Typically, the larger particles will have a lower specific surface area as required.

Not all of the particles used to make the fluorescent lamp in step 104 must have a specific surface area of about $SSA_{MAX}$ or less. Improvements in recyclability can also be obtained where phosphor particles of one or more of the colors used to make the fluorescent lamp have a specific surface area of about $SSA_{MAX}$ or less. For example, the fluorescent lamp may be manufactured using phosphor particles of at least one color that have a specific surface area of about $SSA_{MAX}$ or less. Typically, phosphor particles of the colors red, green, and blue are used for the manufacture of fluorescent lamps. In one aspect of the invention, at least one of these colors is provided by particles having a specific surface area of about $SSA_{MAX}$ or less. Aspects of embodiments of this disclosure are especially suitable for phosphors that comprise one or more rare-earth elements, e.g., one or more selected from Eu, Y, La, Lu, Tb, Er, or the like.

The present invention also includes a fluorescent lamp manufactured according to e.g., the method of FIG. 1. As stated, the fluorescent lamp is provided with a coating of phosphors on a glass tube of the lamp. A variety of shapes and constructions may be used for the tube as known in the art. Additionally, techniques such as that previously described are known in the art for applying the phosphor coating to the tube. The inventor has determined, however, that by controlling the specific surface area of the phosphor particles used in making the lamp, the ability to recover phosphors during recycling of the lamp can be substantially improved as set forth above.

Figure 2:
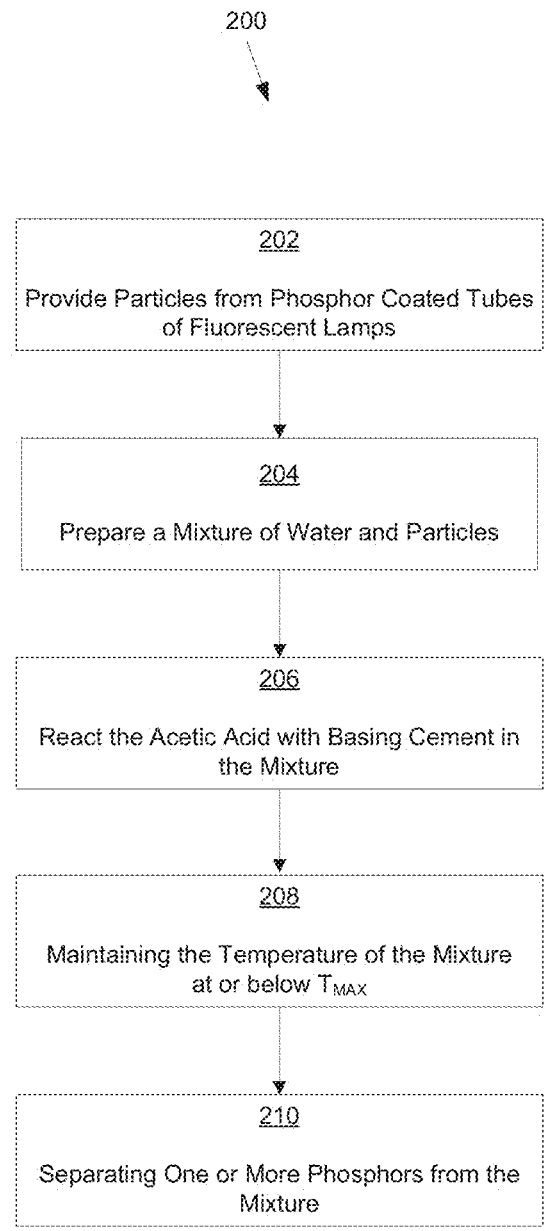

FIG. 2 provides a flowchart illustrating another exemplary method 200 of the present invention. In step 202, particles from phosphor coated tubes of fluorescent lamps are provided. By way of example, separate collection containers can be provided at waste collection centers into which the spent fluorescent lamps are placed. These lamps can then be collected, treated to remove mercury, and converted into particles or a powder that includes the phosphor particles, glass particles, basing cement, and metal impurities from the spent lamps and the equipment used to crush and separate them. These particles can be screened or dry sifted to remove e.g., oversized or larger particles. For example, particles with at least one dimension of about 20 microns or greater may be removed with a 520 mesh screen size. One or more additional steps can also be applied to further remove unwanted materials from the particles as desired.

Next, in step 204, a mixture is created by adding together the particles (which includes the phosphor particles and basing cement), water, and an acid such as acetic acid or other carboxylic acid. Step 204 can be accomplished in several different ways. For example, the mixture can be prepared by delivering the particles into the water and providing agitation to disperse the particles and create a slurry. The acid can then be added to the slurry. Alternatively, the water and acid can be combined with the particles in a single step. Step 204 can also be referred to as a step of washing the particles in the acid and water.

The acid reacts with the basing cement in the slurry in step 206. During this step, the mixture can also be continuously agitated. As indicated previously, the basing cement found in the particles contains mostly calcium carbonate which must be separated from the phosphors for effective recycling. While different acids can be used, acetic acid is a self-buffering, relatively weak acid that will rapidly react with the basing cement without also dissolving a significant amount of the phosphors. Other carboxylic acids, e.g., propionic acid, butanoic acid, or the like, may similarly be used. Stronger acids will also react with basing cement but will also undesirably dissolve a substantial amount of the phosphors.

The amount of acid to use with the mixture can be determined by several methods. For example, the amount of basing cement present in the particles can be estimated and used to calculate the amount of acid needed to react with all of the basing cement present. In one exemplary aspect, enough acetic acid is added to obtain a 1 molar concentration of acetic acid in the mixture of the particles and water.

In another exemplary aspect, acid can be added to the mixture until the pH stabilizes. For example, the particles and water can be combined in a batch reactor. The pH is measured repeatedly while acid is added to the mixture and provided with agitation. The initial additions of acid will combine with the basing cement without significantly lowering the pH of the mixture. However, as more acid is added to the mixture and the basing cement present diminishes by reacting with the acid, the pH will begin to drop and then stabilize. For example, the pH may stabilize in a range of about 3 to 4—indicating that no additional acid is needed. Other methods may be used to determine the amount of acetic acid used in the mixture to react with the basing cement as well.

The inventor has determined that the specific surface area of the phosphor particles has a substantial impact on the amount or rate of dissolution of phosphor particles into the mixture of acid and water. More specifically, phosphor particles having a specific surface area below a predetermined maximum specific surface area, $SSA_{MAX}$, as set forth previously, are less soluble than particles having larger specific surface areas. This property improves the amount of undissolved phosphor particles that can be recovered and reused as part of a recycling process. Accordingly, by manufacturing lamps with phosphor particles having a specific surface area at about $SSA_{MAX}$ or below as set forth above, the recyclability of such lamps can be substantially improved.

Where acetic acid is used in step 204, the inventor has also determined that controlling the temperature of the mixture has a substantial effect on reacting the acetic acid with the basing cement and particularly in limiting the reaction with the phosphors. Accordingly, for this exemplary method and as indicated by step 208, the temperature of the mixture is maintained at or below at certain maximum temperature $T_{MAX}$. In one exemplary embodiment, temperature $T_{MAX}$ is about 30° C. or less. In another exemplary embodiment, temperature $T_{MAX}$ is about 25° C. or less. In still another exemplary embodiment, temperature $T_{MAX}$ is about 20° C. or less. Alternatively, the temperature of the mixture can be maintained within a certain range such as e.g., about 20° C. to about 30° C.

Different techniques may be used to maintain the temperature of the mixture below temperature $T_{MAX}$ or within the range desired. For example, one or both of the water and acetic acid can be cooled prior to adding to the mixture. Using, for example, a batch type reactor with a heat transfer jacket also allows the mixture of water and particles to be cooled and maintained at the proper temperature while the acetic acid is added. Other techniques may be used as well. The present invention may also be employed without controlling the temperature as well.

In step 210, one or more phosphors present in the mixture are removed. Because the reaction of the phosphors with the acetic acid can be significantly reduced if the temperature is controlled, the phosphors will settle as solids upon discontinuing agitation of the mixture. By way of example, a centrifuge can then be used to apply centrifugal forces to further settle the phosphor solids. The liquid can then be decanted from the mixture. Alternatively, or in addition thereto, a vacuum can be applied to remove liquid from the mixture. Other techniques may also be used to separate the phosphor solids.

As previously stated, the amount of phosphor solids recovered in step 210 is also increased by providing particles having a specific surface area of about $SSA_{MAX}$ or less. Although phosphor particles of all colors can be provided with a specific surface area of about $SSA_{MAX}$ or less, improvements in recyclability can also be obtained where the particles of only one color meet this limitation. For example, the phosphor particles provided in step 202 may include red phosphor particles having a specific surface area of about $SSA_{MAX}$ or less.

One or more washing steps can be used to further separate the phosphor solids. For example, the phosphor solids can be washed one more times with e.g., deionized water. Any remaining acetic acid or reaction products of the acetic acid and basing cement can be removed by these washing steps.

The exemplary method 200 as described can be successfully used to remove the phosphors, particularly e.g., yttrium-europium oxide. Other phosphors such as strontium, europium chlorapatite (SECA) phosphors, barium, magnesium, aluminum, europium oxide (BAM) phosphors, or combinations thereof may be removed as well.

As will be understood by one of skill in the art, the present invention is not limited to the steps or order shown in FIGS. 1 and 2 as methods 100 and 200 and other variations and/or steps may also be used. The following examples are provided by way of explanation and illustration only and are not to be construed as limiting the invention.

Example I

Phosphor blends were obtained from lamps utilizing an end out type of recycling process, which involves cutting off the lamp ends, and blowing out the phosphor coating into a cyclone type dust collection system. Similar types of lamps were recycled, using different phosphor blends—utilizing two manufacturing sources of yttrium europium oxide (YEO) or red type phosphor. The blends and lamps were made to be the same color, approximately 4100° K. in color. Samples of the recycled phosphor powder were obtained after mercury retort treatment, followed by dry sifting to remove large contaminants and glass chips. The samples were then washed and subjected to a dilute acetic acid wash—with at least one sample washed at room temperature and another washed with heating to approximately 80° C. (briefly) in a microwave oven. The washing treatments and cell designations are shown in Table I.

Lamps were made from the recovered and washed phosphors, coated at identical weights, and made as identically as possible at the Bucyrus Lamp Plant of Bucyrus, Ohio. The resulting color of the lamps is a strong indicator of phosphor composition and such is also shown in Table I. From the color chromaticity readings, the phosphor blend composition that would produce the indicated color was estimated is also shown in the Table I below for the corresponding lamp chromaticity values.

TABLE I

| Test cell designation | Washing treatment | YEO phosphor specific surface area | Lamp Chromaticity X | Lamp Chromaticity Y | Calculated phosphor fractions (from chromaticity) Red (YEO) | Calculated phosphor fractions (from chromaticity) Green (LAP) | Calculated phosphor fractions (from chromaticity) Blue (BAM) |
|---|---|---|---|---|---|---|---|
| Cell F (8 lamps, 2.7 g/b) | Room temp (22° C.) | 6.5 m²/g | 0.353 | 0.357 | 0.310 | 0.490 | 0.200 |
| Cell G (8 lamps, 2.7 g/b) | 80° C., short time | 6.5 m²/g | 0.305 | 0.371 | 0.133 | 0.632 | 0.235 |
| Cell H (8 lamps, 2.7 g/b) | 80° C., short time | 3.2 m²/g | 0.342 | 0.360 | 0.271 | 0.521 | 0.208 |

The results in Table I indicate that high temperature acetic acid wash causes a reduction in the indicated red phosphor content of the lamps produced, relative to the room temperature wash procedure. Furthermore, the sample of red phosphor (YEO) particles with lower specific surface area experienced less loss of red phosphor particles during the high temperature wash treatment, which indicates less actual loss of red phosphor particles during the acid washing treatment. Thus, Example I indicates that the use of lower specific surface area red phosphor particles shows a beneficial behavior.

Example II

Two samples of commercially produced yttrium oxide phosphor or red type phosphor were obtained, one with a lower specific surface area than the other as set forth in Table II below.

TABLE II

| Sample B, commercial YEO | Fired without fluxing agents | 8-10 square meters per gram |
|---|---|---|
| Sample D, commercial YEO | Fired with fluxing agents | 2-4 square meters per gram |

For each of these phosphor samples, 54 grams was dispersed in 1.5 liters of deionized water and heated to 51.5° C. with stirring. A turbid slurry of phosphor particles was observed, as expected. Next, 90 grams of glacial acetic acid was added to the slurry, and small samples were extracted and cooled at the time intervals indicated in the graph shown in FIG. 3. The extracted samples were immediately centrifuged (to separate undissolved phosphor solids) and the clear supernatant was analyzed for yttrium acetate content using a gravimetric method.

The gravimetric analysis method for yttrium acetate content involved weighing a clean porcelain crucible, adding a quantity of the supernatant solution, weighing again to determine the exact sample size, followed by removing the water in an oven at 80° C. for approximately 24 hours. Finally, the dried crucible was weighed again to determine the yttrium acetate quantity. All weights were performed using an analytical balance capable of 0.0001 gram accuracy. Solution sample size was typically 5 to 6 grams, so the ability to determine even small quantities of YEO dissolution, forming yttrium acetate, was good.

Figure 3:
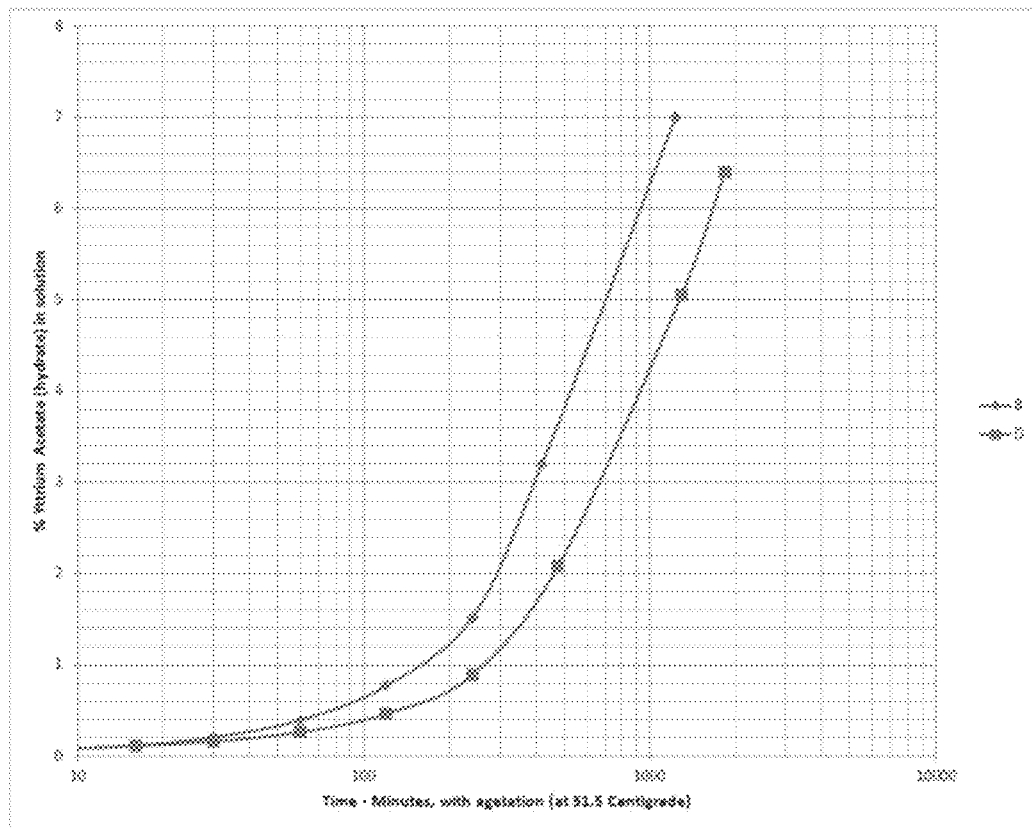
FIGS. 3 and 4 provide plot of phosphor concentrations versus time as determined by experiments more fully described below.

Results for timed extractions are shown in FIG. 3 for the two phosphor types for times approaching 2000 minutes (33 hours). The effect of specific surface area can be seen and is significant from a standpoint of improving recyclability.

Additional experiments were performed to further ascertain the effect of temperature as set forth below.

Example III

Recycled lamp phosphor was obtained from Bucyrus Lamp Plant of Bucyrus, Ohio. The lamp phosphor was obtained directly from an end-cut type recycling process where phosphor is blown into a cyclone collector and retorted to remove mercury. The phosphor was obtained primarily from Polylux type T8 lamps.

A phosphor sample, approximately 5 kilograms in size, was dry sifted to remove glass and oversize contaminants using a 325 mesh screen, then washed repeatedly in a mixture of water and acetic acid prior to making into coating for construction of F32T8 type fluorescent lamps. All coating formulations, lamp coating and lamp making were done in the same manner for each wash treatment compared in TABLE I below.

TABLE III shows washing variations, for 500 gram lots of the original 5 kilogram sample, performed with water, room temperature (i.e. cold) acetic acid solution, and with relatively hot acetic acid solution. The concentration of acetic acid in the wash solutions was 10% on a weight basis and 700 grams of solution was used to treat 500 grams of recycled phosphor.

TABLE III

Summary of acetic acid washed cells

| Wash No. (8 lamp sample size) | Chromaticity (100 hr) X | Chromaticity (100 hr) Y | Calculated phosphor fractions (from chromaticity) Red | Calculated phosphor fractions (from chromaticity) Green | Calculated phosphor fractions (from chromaticity) Blue |
|---|---|---|---|---|---|
| Wash No. 1 | 0.3553 | 0.3583 | 0.315 | 0.489 | 0.197 |
| Wash No. 2 | 0.3534 | 0.3574 | 0.310 | 0.490 | 0.200 |
| Wash No. 3 | 0.3045 | 0.3707 | 0.133 | 0.632 | 0.235 |

Wash No. 2, the "cold" condition, was held at room temperature (21 to 22° C.) for 24 hours. Wash No. 3, the "hot" wash condition, was heated using a microwave oven to achieve 85° C. for a few minutes, followed by cooling with gentle agitation. Both the hot and cold acetic acid treatments were removed by repeated mixing with fresh deionized water, sedimentation of phosphor, and decantation of the supernatant. This water wash procedure was repeated five times to assure complete removal of the acid solution prior to reconstitution into lamp coating.

The wet, washed phosphor was finally reworked into a lamp coating dispersion by adding the following ingredients for a 500 gram phosphor quantity:

1) 500 grams polyethylene oxide solution, 5%, made using Polyox™ N3000 (Dow Chemical Company, Houston, Tex.);

2) 10 grams surfactant, 5%, made from Pluronics™ F108 (PEO-PPO copolymer type—nonionic) (BASF, Florham Park, N.J.);

3) 84 grams fumed alumina dispersion, 12% by weight, made from Cabot Spectral™ 81 alumina (Cabot Corporation, Boston Mass.).

4) water to adjust coating viscosity (to achieve 2.7 grams coating weight for a standard F32T8 lamp bulb).

The above additives were added with mixing to assure a homogeneous blend with minimal foam. Lamp tubing was coated using this reconstituted phosphor coating in the usual manner and made into F32T8 lamps using a standard process.

Fluorescent lamps made from the cold acetic acid Wash No. 2 in Table III showed little shift in color from the control sample Wash No. 1 washed only with deionized water. Lamps made from hot acetic acid Wash No. 3 showed much less presence of red because of the reaction with the yttrium-europium oxide (YEO) or red phosphor. More than half of the original red phosphor is lost due to the hot acetic acid washing as indicated in Table III.

Gravimetric measurements of total phosphor remaining after the wash treatments indicated approximately 15% of the total phosphor was lost (mostly red) due to the hot acetic acid treatment. This result supports the significant loss of YEO or red phosphor during the hot acetic acid wash treatment, which does not occur or occurs to a much lower extent for the room temperature acetic acid wash.

Accordingly, these experimental results suggest that acetic acid mixtures at about room temperature or cooler may be used to recover phosphors without significant loss of the YEO or red phosphor. More specifically, acetic acid can be used to react readily with the basing cement—particularly calcium carbonate—and provide for removal of the same without significant loss of the YEO or red phosphor. This advantageous result is even more significant at lower temperatures as indicated with the next example. It is expected that this result would also be improved if phosphor particles have a lower specific surface area were predominate in the sample.

Example IV

In order to better quantify the rate of dissolution of YEO or red phosphor in dilute acetic acid solutions as a function of time and temperature, the following experiment was performed. A thermostatically controlled mixing vessel, lined with glass and contacted by stainless steel components, was arranged to control temperature while mixing a slurry of YEO phosphor and dilute acetic acid solution. The following recipe was chosen for the proportions:

| | |
|---|---|
| 1) Water | 1500 grams (cubic centimeters) |
| 2) Phosphor | 54 grams |
| 3) glacial acetic acid | 90 grams |

The phosphor and water were first mixed. The temperature was adjusted to the desired level and stabilized using the thermostatically controlled heating/cooling unit. Once the temperature stabilized, the acetic acid was added and the timed test began. Small samples of the dispersion were removed at the times indicated in the graph shown in FIG. 4, cooled, and then separated using a centrifuge. The supernatant water solution was checked, by gravimetric methods, for yttrium acetate content, which is shown plotted in FIG. 4 on the y-axis.

The gravimetric method involved filling a weighed crucible with solution, weighing the crucible with the solution, drying in an oven at 80° C., and weighing again when cool. All weights were determined using an analytical balance capable of measuring to the nearest 0.0001 grams. The phosphor was not completely dissolved—as indicated by a white turbid slurry in the main mixing and temperature controlled chamber.

Figure 4:
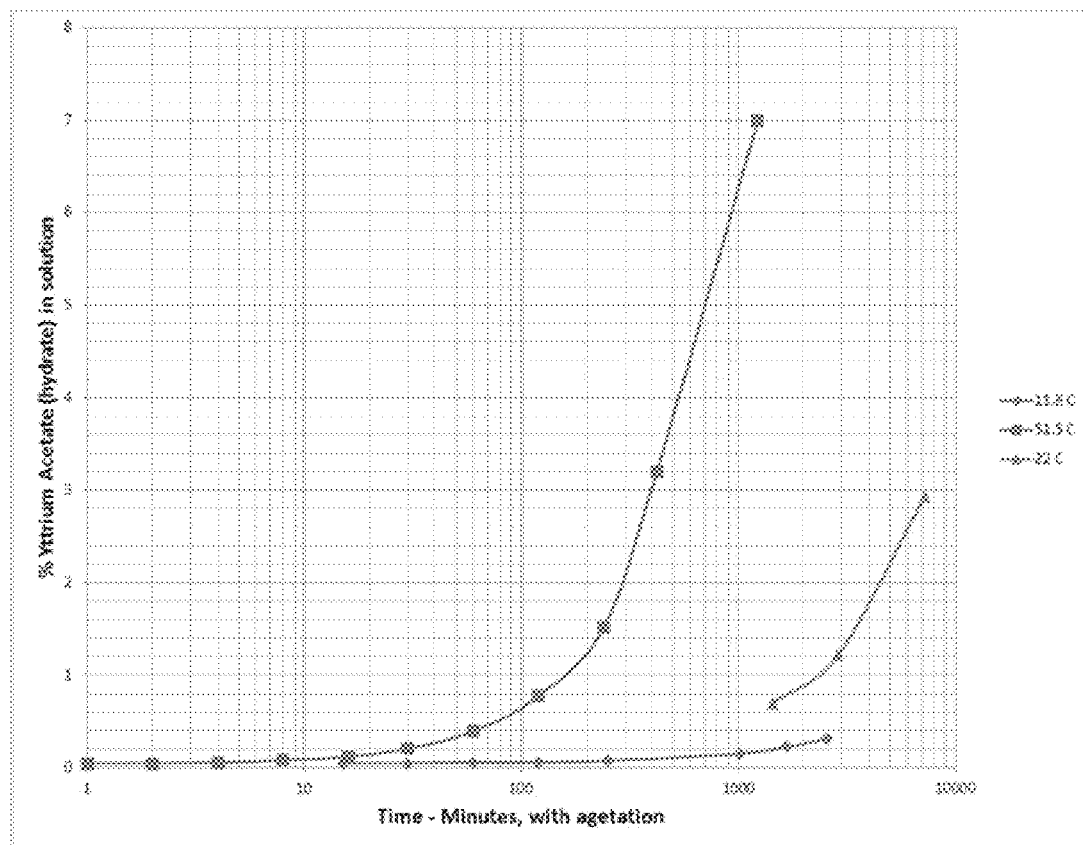

Referring to the plot in FIG. 4, the role of temperature is significant. The amount dissolved at 1000 minutes (17 hours) was approximately 100 times greater for the 51.5° C. temperature compared with 11.8° C. Thus, keeping the washing process cool provides a strong benefit for acetic acid washing. Room temperature (about 22° C.) indicated an intermediate dissolution rate—still significantly faster than the cooler 11.8° C. Thus, an advantageous and unexpected result occurs from controlling the temperature during the mixing or wash process so as to help minimize the loss of valuable YEO or red phosphor when extracting calcium carbonate and other contaminants in the process of reclaiming recycled phosphors. It is expected that this result would also be improved if phosphor particles have a lower specific surface area were predominate in the sample.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for recycling, comprising the steps of: preparing a mixture comprising: phosphor particles and basing cement obtained from phosphor coated tubes of fluorescent lamps; water; and acid, wherein the phosphor particles of at least one color have a specific surface area of about 5 $m^2$/gram or less; reacting the acid with the basing cement; and separating all or portion of the phosphor particles from the mixture.

2. A method for phosphor recycling as in claim 1, further comprising the step of maintaining the mixture at a temperature of about 30 degrees Celsius or less.

3. A method for phosphor recycling as in claim 1, further comprising the step of maintaining the mixture at a temperature of about 25 degrees Celsius or less.

4. A method for phosphor recycling as in claim 1, further comprising the step of maintaining the mixture at a temperature of about 20 degrees Celsius or less.

5. A method for phosphor recycling as in claim 1, wherein the acid in said step of preparing comprises acetic acid.

6. A method for phosphor recycling as in claim 1, further comprising the step of measuring the pH of the mixture and, if the pH of the mixture has not stabilized, then adding more acid to the mixture until the pH stabilizes.

7. A method for phosphor recycling claim 1, wherein the basing cement comprises calcium carbonate.

8. A method for phosphor recycling as in claim 1, wherein the at least one color is red.

9. A method for phosphor recycling as in claim 1, wherein the phosphor particles of at least one color have a specific surface area of about 2 $m^2$/gram or less.

10. A method for phosphor recycling as in claim 1, wherein the phosphor particles of at least one color have a specific surface area of about 0.8 $m^2$/gram or less.

11. A method for phosphor recycling as in claim 2, further comprising the step of manufacturing a fluorescent lamp using phosphor particles from said step of separating.

12. A method for phosphor recycling, comprising the steps of: preparing a mixture comprising: phosphor particles, basing cement, metal impurities, and glass particles obtained from phosphor coated tubes of fluorescent lamps, water; and acid, wherein the phosphor particles of at least one color have a specific surface area of about 5 $m^2$/gram or less; reacting the acid with the basing cement, the metal impurities, or the glass particles; and separating all or a portion of the phosphor particles from the mixture.

13. A method for phosphor recycling as in claim 12, further comprising the step of maintaining the mixture at a temperature of about 30 degrees Celsius or less.

14. A method for phosphor recycling as in claim 12, wherein the acid in said step of preparing comprises acetic acid.

15. A method for phosphor recycling as in claim 12, wherein the basing cement comprises calcium carbonate.

16. A method for phosphor recycling as in claim 12, wherein the phosphor particles of at least one color have a specific surface area of about 2 $m^2$/gram or less.

17. A method for phosphor recycling as in claim 12, further comprising the step of manufacturing a fluorescent lamp using phosphor particles from said step of separating.

* * * * *